United States Patent
Dayal et al.

(10) Patent No.: US 9,128,910 B1
(45) Date of Patent: Sep. 8, 2015

(54) AVOIDING LONG ACCESS LATENCIES IN REDUNDANT STORAGE SYSTEMS

(75) Inventors: Shobhit Dayal, San Francisco, CA (US);
Edward K. Lee, San Jose, CA (US);
Mark G. Gritter, Eagan, MN (US)

(73) Assignee: Tintri Inc., Mountain View, CA (US)

( * ) Notice: Subject to any disclaimer, the term of this patent is extended or adjusted under 35 U.S.C. 154(b) by 205 days.

(21) Appl. No.: 13/421,714

(22) Filed: Mar. 15, 2012

Related U.S. Application Data

(60) Provisional application No. 61/453,362, filed on Mar. 16, 2011.

(51) Int. Cl.
G06F 12/00 (2006.01)
G06F 11/22 (2006.01)
G06F 11/30 (2006.01)
G06F 11/10 (2006.01)
G06F 12/02 (2006.01)
G06F 12/08 (2006.01)
G06F 13/16 (2006.01)

(52) U.S. Cl.
CPC ............ *G06F 11/22* (2013.01); *G06F 11/1092* (2013.01); *G06F 11/3055* (2013.01); *G06F 12/0246* (2013.01); *G06F 12/0897* (2013.01); *G06F 13/1694* (2013.01)

(58) Field of Classification Search
USPC .................................. 711/100, 114, E12.001
See application file for complete search history.

(56) References Cited

U.S. PATENT DOCUMENTS

| | | | |
|---|---|---|---|
| 2009/0319814 A1* | 12/2009 | Pastorello et al. | 713/400 |
| 2010/0023685 A1* | 1/2010 | Ikejiri et al. | 711/114 |
| 2012/0084505 A1* | 4/2012 | Colgrove et al. | 711/114 |

OTHER PUBLICATIONS

Chen et al., Raid: High Performance Reliable Secondary Storage, ACM Computing Surveys vol. 26 No. 2, Jun. 1994.
Patterson et al., A Case for Redundant Arrays of Inexpensive Disks RAID, ACM 1988 pp. 109-116.
James S. Plank, A Tutorial on Reed-Solomon Coding for Fault-Tolerance in Raid-like Systems, Software-Practice and Experience vol. 27(9), 995-1012 (Sep. 1997).
Thomasian et al., RAID5 Performance with Distributed Sparing, IEEE Transactions on Parallel and Distributed Systems vol. 8, No. 6, Jun. 1997.
Kim et al., Harmonia: A Globally Coordinated Garbage Collector for Arrays of Solid-state Drives, IEEE, 2011.

* cited by examiner

*Primary Examiner* — Midys Rojas
(74) *Attorney, Agent, or Firm* — Van Pelt, Yi & James LLP

(57) ABSTRACT

Avoiding long access latencies in redundant storage systems is disclosed, including: determining a first device associated with a request is in a slow access period; and reconstructing data associated with the request from one or more other devices comprising a redundant storage system in which the first device and the one or more other devices are included.

30 Claims, 8 Drawing Sheets

1) A request is sent to Device A

2) After the request to Device A times out, reconstruction is performed using Devices B, C, D, and E 1) Device A to which a request is to be sent is determined to be currently in a scheduled slow access period
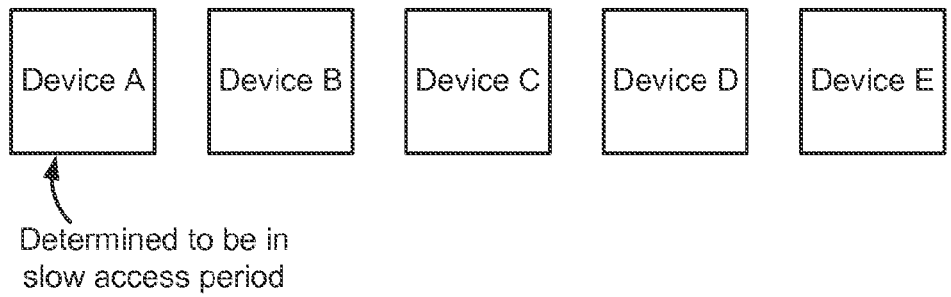
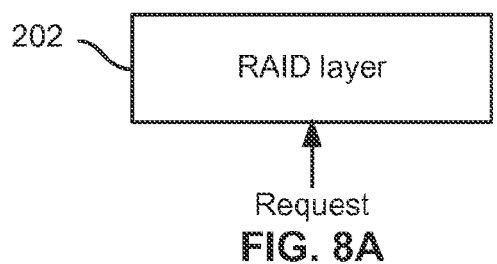
FIG. 8A
2) Because Device A is in a known slow access period, reconstruction operation is performed using Devices B, C, D, and E
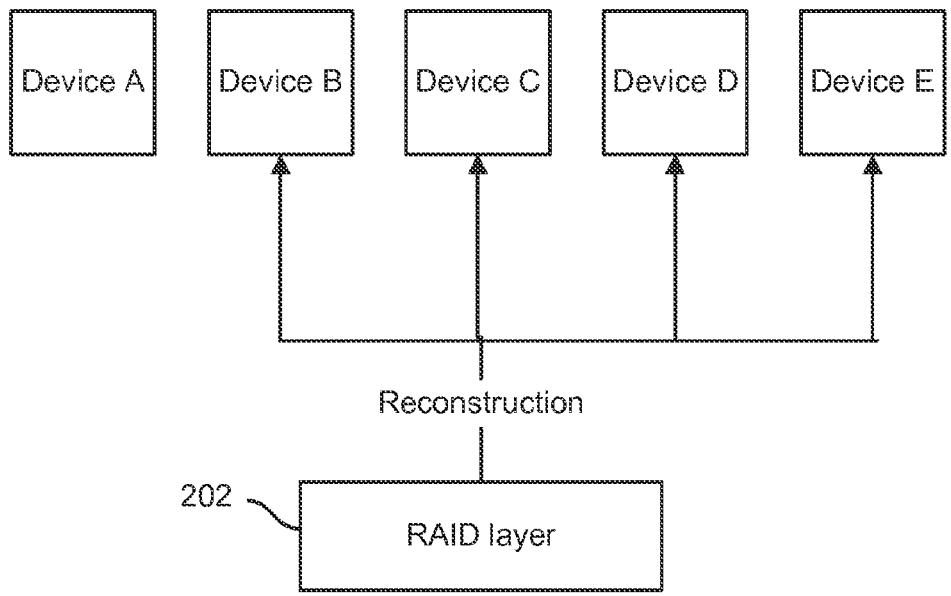
FIG. 8B

AVOIDING LONG ACCESS LATENCIES IN REDUNDANT STORAGE SYSTEMS

CROSS REFERENCE TO OTHER APPLICATIONS

This application claims priority to U.S. Provisional Patent Application No. 61/453,362 entitled AVOIDING LONG DISK ACCESS LATENCIES IN REDUNDANT STORAGE SYSTEMS filed Mar. 16, 2011 which is incorporated herein by reference for all purposes.

BACKGROUND OF THE INVENTION

In some storage devices, as part of normal operation, the device occasionally needs to perform internal activities for a period of time, such as garbage collection, defragmenting, updating metadata, etc. However, when a request to access data stored on a device is sent to the device while the device is performing internal activities, the access may sometimes take much longer than usual due to the competing internal activities. For example, a normal response by a device to a request for access may take less than a millisecond. But a response by the device to the request while the device is performing internal activities may take up to hundreds of milliseconds.

BRIEF DESCRIPTION OF THE DRAWINGS

Various embodiments of the invention are disclosed in the following detailed description and the accompanying drawings.

FIGS. 8A and 8B are diagrams showing an example of implementing process 700.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
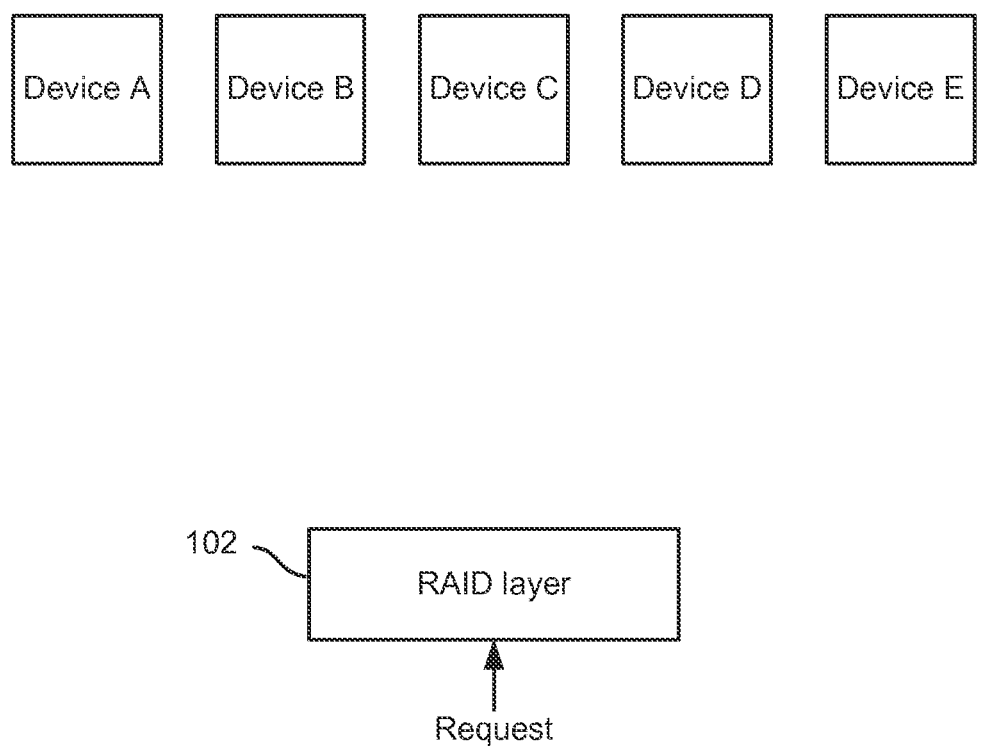
FIG. 1 is an example of a redundant storage system.

FIG. 1 is an example of a redundant storage system. In FIG. 1, at least Devices A, B, C, D, and E form a group of redundant storage devices. For example, in the example shown in FIG. 1, each of Devices A, B, C, D, and E may be a hard disk or a solid state drive. The Devices A, B, C, D, and E form a RAID (Redundant Array of Independent Disks) group that is managed in part by RAID layer 102. The Devices A, B, C, D, and E in the RAID group comprise a logical container. At least some of Devices A, B, C, D, and E are configured to store at least some data that is redundantly stored on one or more other devices of the group based on a policy of data distribution applied to the RAID group. Typically, data stored at a RAID group is "striped" across the devices such that logically sequential data is segmented in a way that accesses of sequential segments can be made to different devices. RAID layer 102 is configured at least in part to receive requests from an application and to send the requested data back to the application. One advantage of a RAID group is the fault tolerance provided by the redundancy of data stored among the devices of the group. In the event that a device in the group fails, the data stored on the failed device may be reconstructed using data on the remaining, available devices of the group. For example, in a typical RAID group, parity data written on an available drive may be used, along with data read from other available drives, to reconstruct data that was stored on a failed device or that has become corrupted as stored on a device. When XOR parity is used, for example, the parity data may be used to perform XOR computations using the parity data and related data in a set of data values that has been striped across devices in the RAID group to reconstruct data that cannot be read because a drive on which it was stored has failed. Typically, a reconstruction operation is performed when a disk failure is detected, for example when a disk controller informs the RAID controller that an operation to read data at the disk has failed.

In the example of FIG. 1, a request (e.g., a read request or a write request) is received at RAID layer 102. RAID layer 102 is configured to send the received request to the devices in the group that store the requested data. Assume that in this example, the requested data is stored on at least some of Devices A, B, C, D, and E. So, RAID layer 102 is configured to send the request to at least one of Devices A, B, C, D, and E that is determined to store the requested data to retrieve such data.

Avoiding long access latencies in redundant storage systems is disclosed. Storage devices in a redundant storage system may be configured to perform internal activities during certain periods, and such activities may result in a device responding more slowly during such periods to requests to access data stored on the device (e.g., a read request or a write request), as compared to the time required to respond to an access to the device while the device is not performing such internal activities. In some embodiments, a period in which a storage device performs slower or longer than usual accesses is referred to as a "slow access period." To avoid a slow/long disk access caused by the requested device performing internal activities or by one or more other reasons, in some embodiments, a timeout duration is assigned to each request associated with a first storage device such that once the timeout duration expires for the request, the first storage device is assumed to be in a slow access period and the requested data is reconstructed using data obtained from one or more storage devices other than the first storage device, even if no indication has been received that the operation to read the data at the first storage device has failed. In some embodiments, a timeout duration is dynamically determined for each request based at least on one or more factors (e.g., attributes associated with the request including the size of request). In some other embodiments, the timing of the respective slow access period for each of a plurality of storage devices in a redundant storage system is controlled, for example by scheduling, triggering, and/or forcing the start time(s) of the slow period(s) for each storage device, such that a request that is associated with a storage device that is currently in a scheduled slow access period is (likely) able to be serviced using one or more other storage devices that also store portions of the requested data and/or parity information that can be used to reconstruct the requested data and which are not (likely) at that same time to also be in a scheduled/triggered/forced slow access period.

Figure 2:
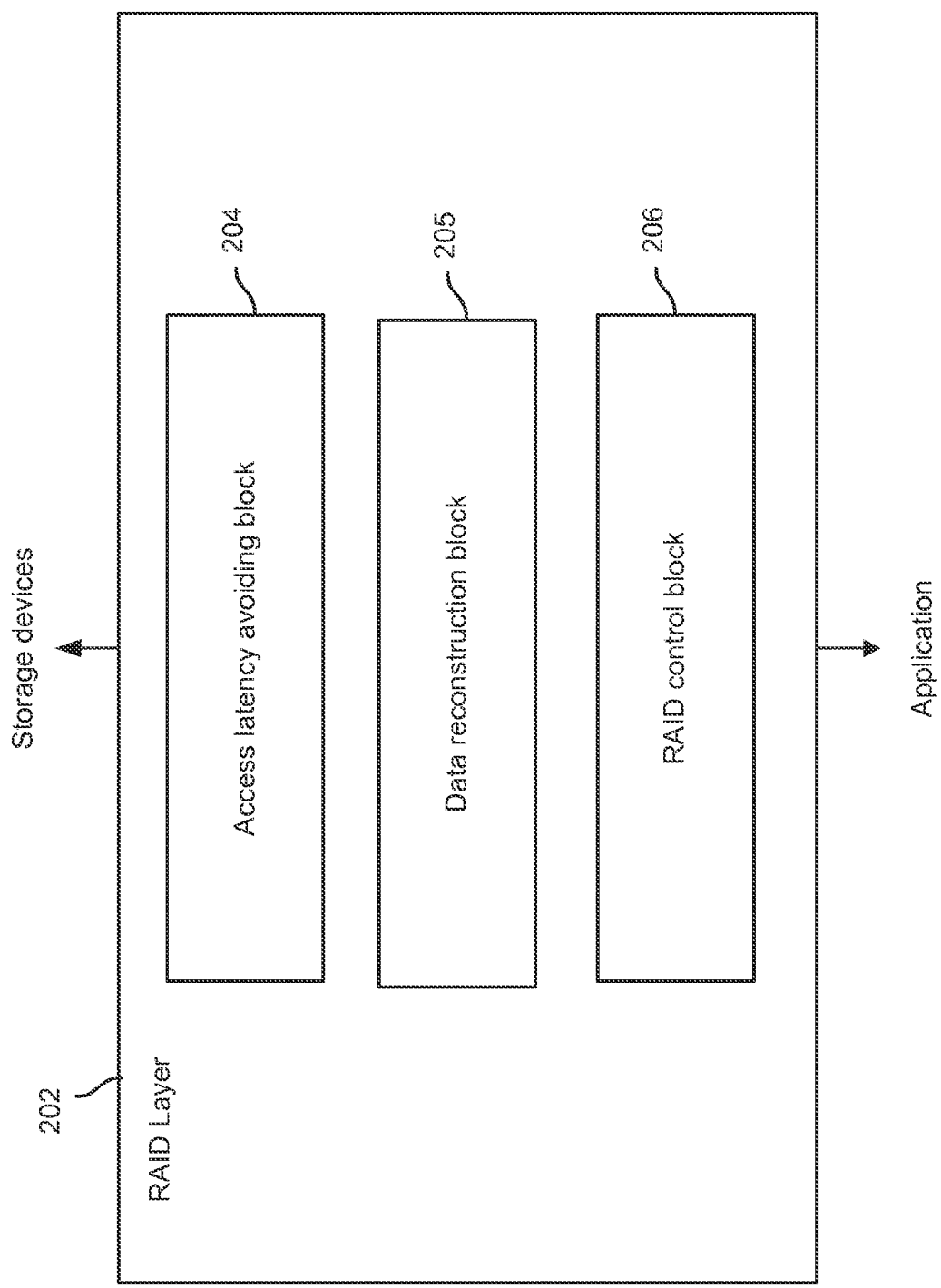
FIG. 2 is a diagram showing an embodiment of a RAID layer.

FIG. 2 is a diagram showing an embodiment of a RAID layer. In some embodiments, RAID layer 202 is configured to manage a group of redundant storage devices that comprise a RAID group. For example, each of the storage devices in the group comprises a hard disk or a solid state disk. In some embodiments, RAID layer 202 is at least part of a storage system that includes at least the RAID group. In some embodiments, RAID layer 202 and the blocks included in the layer are implemented using one or both of software and hardware. In the example, RAID layer 202 includes at least access latency avoiding block 204, data reconstruction block 205, and RAID control block 206. The RAID control block 206 is at least configured to receive requests (e.g., read requests or write requests sent by an application), to service the requests, and to send the results (e.g., requested data) back to the requesting application.

In some embodiments, RAID layer 202 is configured to initially send a request to one storage device in the group of redundant storage devices based on, for example, a determination that the storage device stores the data that is requested and/or an identifier in the request associated with that storage device. In some embodiments, access latency avoiding block 204 is configured to determine a timeout duration for each request. In some embodiments, access latency avoiding block 204 is configured to determine a specific timeout duration for each request based on factors such as one or more of the following: a fixed timeout length assigned (e.g., by a system administrator) to the device, a size of data requested, a priority associated with the request, a priority associated with the device, a priority associated with the entity (e.g., an application or other caller) that issued the request (e.g., because some requesting entities are more sensitive to latency than others), and a current queue length associated with the device. If the storage device to which the request was initially sent does not respond to the request by the end of the timeout duration (e.g., due to the device being in a slow access period), then the storage device is assumed to be in a slow access period and access latency avoiding block 204 is configured to service the request using one or more storage devices other than the storage device to which the request was initially sent. For example, access latency avoiding block 204 can issue the request to one or more other storage devices by invoking a reconstruction operation to be performed by data reconstruction block 205. Data reconstruction block 205 is configured to issue requests to other devices that store at least some of the requested data on the first device and/or parity information that could be used to reconstruct the data requested from the first device. Once the other devices receive the reconstruction operation requests, the other devices will respond with the relevant data and/or parity information needed by RAID layer 202 to reconstruct the requested data, which will be sent back to the requesting entity.

In some embodiments, access latency avoiding block 204 is configured to determine a scheduled time for each of the storage devices in the group to be forced to enter the slow access period. For example, a storage device may be "forced" to enter a slow access period using a special command associated with sending/forcing the storage device into such a slow access period (e.g., using a special command that is designated by the vendor of the storage device or by sending a command that has been observed or otherwise been determined to cause the device to enter its slow access period). In some embodiments, access latency avoiding block 204 is configured to determine a different scheduled slow access period start time for each storage device in the group of storage devices. In some embodiments, access latency avoiding block 204 is configured to determine the schedule of storage device forced slow access periods such that no two different storage devices will be in a slow access period during overlapping times. This way, all but one of a group of storage devices storing at least some redundant data and/or parity information can still be available to service incoming requests. In some embodiments, access latency avoiding block 204 is configured to schedule slow access periods for the storage devices in the group based on the performances or other changing states of the storage devices. In some embodiments, access latency avoiding block 204 is configured to schedule a slow access period to occur for a storage device not substantially more than the frequency that the storage device would enter a slow access period on its own, without being forced to enter such a period. As such, when slow access periods have been scheduled for the group of storage devices, for a subsequently received request, access latency avoiding block 204 is configured to determine whether the request is associated with a storage device that is currently in a scheduled slow access period. In some embodiments, if the storage device is currently in a scheduled slow access period, then access latency avoiding block 204 is configured to immediately fulfill the request using one or more other storage devices and not wait out a timeout duration (if one has been determined for the request). For example, access latency avoiding block 204 can issue the request to one or more other storage devices using a reconstruction operation.

Figure 3:
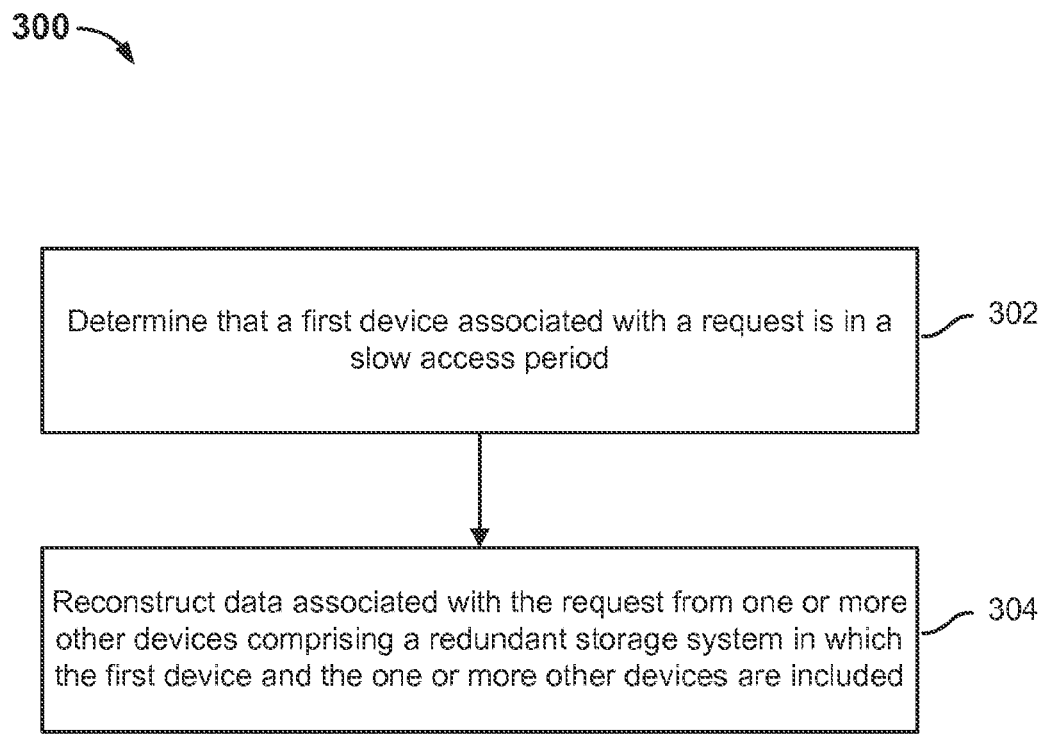
FIG. 3 is a flow diagram showing an embodiment of a process for avoiding long access latency.

FIG. 3 is a flow diagram showing an embodiment of a process for avoiding long access latency. In some embodiments, process 300 is implemented using RAID layer 202.

At 302, it is determined that a first device associated with a request is in a slow access period. In some embodiments, the device is part of a redundant storage system comprising two or more storage devices. In some embodiments, a request (e.g., a read request or a write request) is associated with a device based on an identifier included in the request associated with the device. In some embodiments, the request is associated with the device based on a determination that the device stores the requested data. In some embodiments, the device is determined to be in a slow access period based on a timeout duration associated with the request timing out. In some embodiments, the device is determined to be in a slow access period based on a state of the device that indicates that the device is currently in a forced slow access period. When the device exits the slow access period the state of the device is updated to indicate that the device is not currently in a forced slow access period. In some embodiments, when the device is determined to have exited a slow access period is determined by the completion of the command that had forced the device into the slow access period.

At 304, data associated with the request is reconstructed from one or more other devices comprising a redundant storage system in which the first device and the one or more other devices are included. In some embodiments, the requested data can be reconstructed with data obtained from one or more devices other than the device that the request was initially sent to and/or is associated with. For example, the requested data can be retrieved using a reconstruction operation via one or more other devices that also store portions of the requested data and/or parity information that can be used to reconstruct the requested data. In some other embodiments, instead of performing reconstruction, the requested data can be retrieved from a device in another tier of storage.

Figure 4:
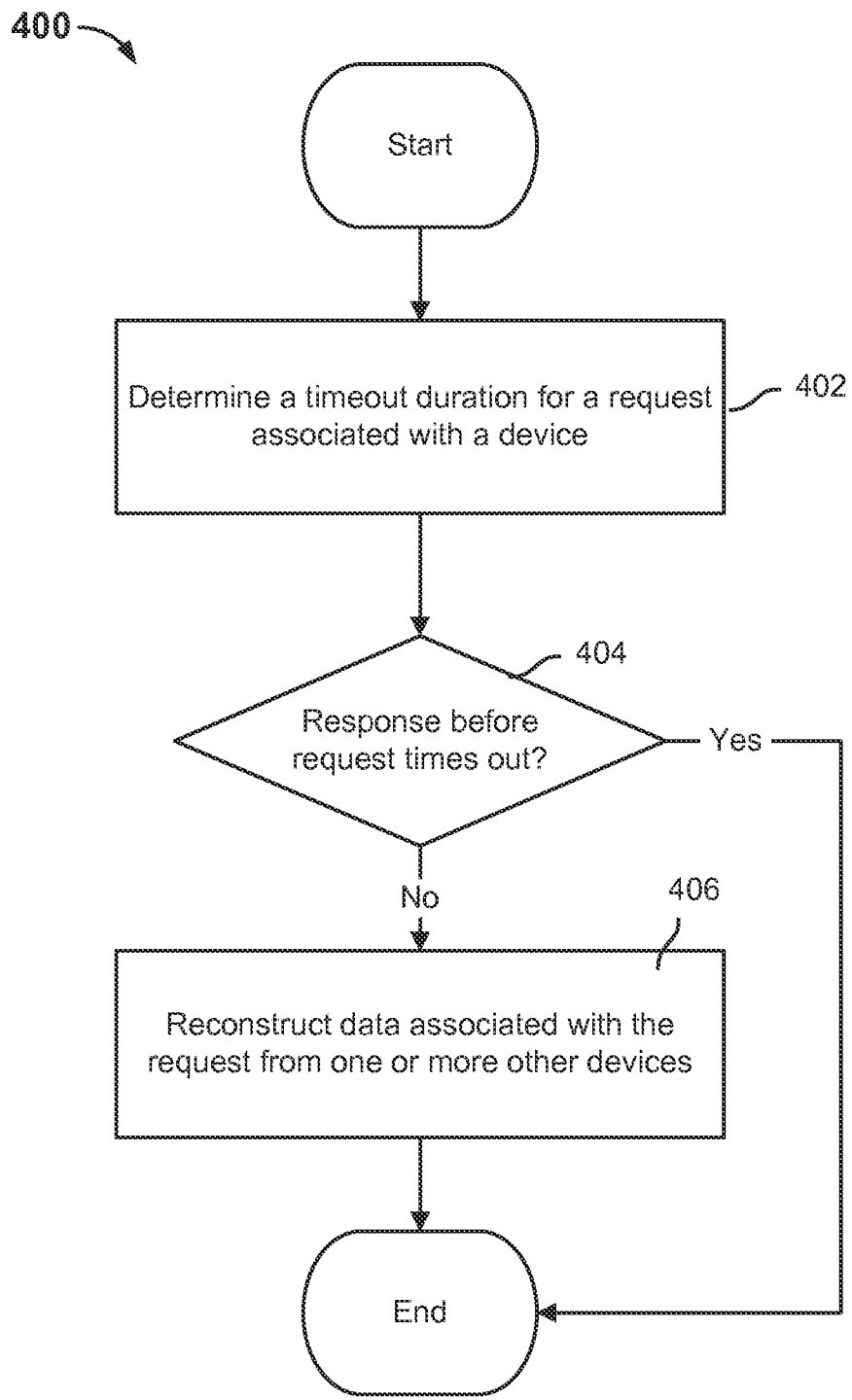
FIG. 4 is a flow diagram showing an embodiment of a process for avoiding a long access latency.

FIG. 4 is a flow diagram showing an embodiment of a process for avoiding a long access latency. In some embodiments, process 400 is implemented using RAID layer 202. In some embodiments, process 300 is implemented using process 400.

At 402, a timeout duration for a request associated with a device is determined. In some embodiments, for a request received at the RAID layer to be issued to one device of a group of redundant storage devices (e.g., SSDs), a timeout duration is determined based on one or more factors. For example, the factors could include one or more of the following: a fixed timeout length assigned (e.g., by a system administrator) to the device, a size of data requested, a priority associated with the request, a priority associated with the device, a priority associated with the entity (e.g., an application or other caller) that issued the request (e.g., because some requesting entities are more sensitive to latency than others), and a current queue length associated with the device. One benefit to tailoring the timeout duration to the attributes of each request is to prevent waiting too long to timeout a small read request, which can cause long latency, or prematurely timing out a large request, which can cause the overall storage system to get overloaded due to extra requests. Another benefit to tuning the timeout duration to the attributes of each request is that longer timeout durations can be assigned to requests from requesting entities that are less sensitive to access latency, and as a result the system is not additionally burdened by the performance of unnecessary reconstructions. In various embodiments, subsequent to determining a timeout duration for the request, the request is issued to the device.

At 404, it is determined whether a response from the device is received before the request times out. For example, once the request is issued to the device, a clock will run until the determined timeout duration is over. In the event that the response is received before the timeout duration is over, the request is considered to have been serviced, in which case the process ends. In the event that the response is not received before the timeout duration is over, the device is assumed to be in a slow access period and control passes to 406.

At 406, data associated with the request is reconstructed from one or more other devices. In some embodiments, the data associated with the request is obtained via a reconstruction operation via one or more devices in the group of devices other than the device to which the request was originally sent/intended that also store portions of the requested data and/or parity information that could be used to reconstruct the requested data.

In some other embodiments, instead of performing reconstruction, the data associated with the request is obtained via a request to one or more devices at a tier of storage different than the tier of storage that the device the request was originally sent to belongs, where the different tier of storage stores at least some data redundant to data that is stored at the other tier of storage. In various embodiments, a tiered storage system includes SSD disks at the primary tier storage and hard disks at the secondary storage tiers. For example, if the request was originally sent to a device in a tier of storage associated with SSDs, then once the request times out, the request can be sent to one or more devices in a tier of storage associated with hard disks.

Figure 5A:
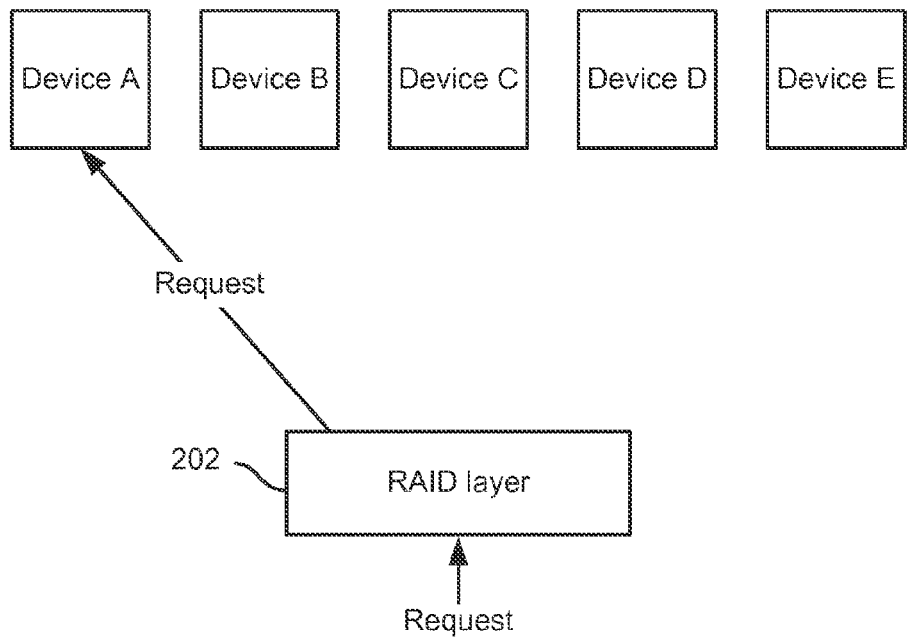
FIGS. 5A and 5B are diagrams showing an example of implementing process 400.
Figure 5B:
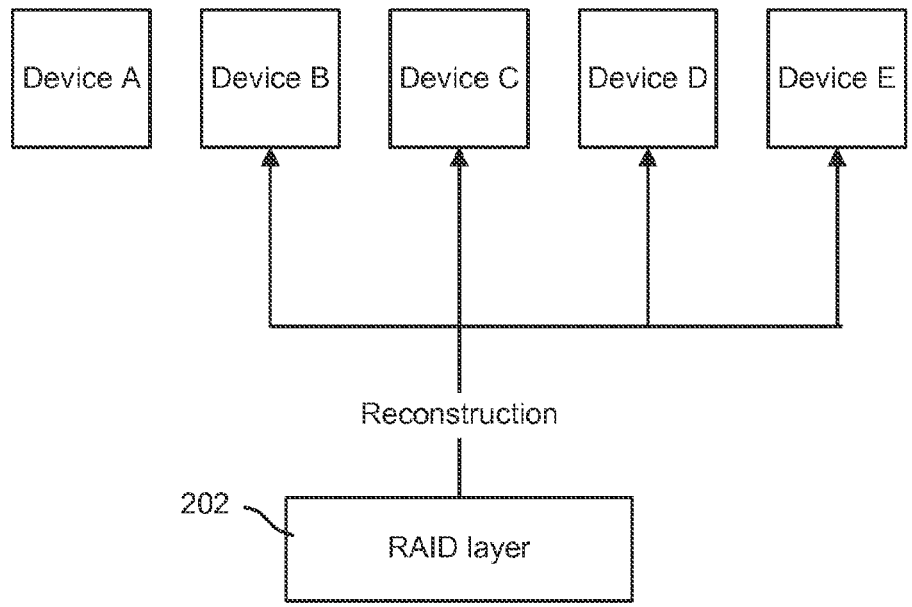

FIGS. 5A and 5B are diagrams showing an example of implementing process 400. In the examples, RAID layer 202 is implemented using the example described in FIG. 2. In FIG. 5A, a request is received by RAID layer 202 and then issued to Device A. A timeout duration is determined by RAID layer 202 for the request. For example, the timeout duration can be determined prior to the issuance of the request to Device A or after the issuance of the request to Device A. Once the timeout duration has been determined, the clock starts to run. In FIG. 5B, it is determined that the request sent to Device A has timed out before Device A had an opportunity to respond (e.g., because Device A was in a slow access period and/or due to one or more other reasons). Because the request has timed out at Device A, Device A is assumed to be in a slow access period and RAID layer 202 obtains the requested data via a technique alternative to requesting the data from Device A. In the example, RAID layer 202 performs a reconstruction operation to retrieve the requested data from Devices B, C, D, and E, which each stores data and/or parity information needed to reconstruct the requested data.

Figure 6:
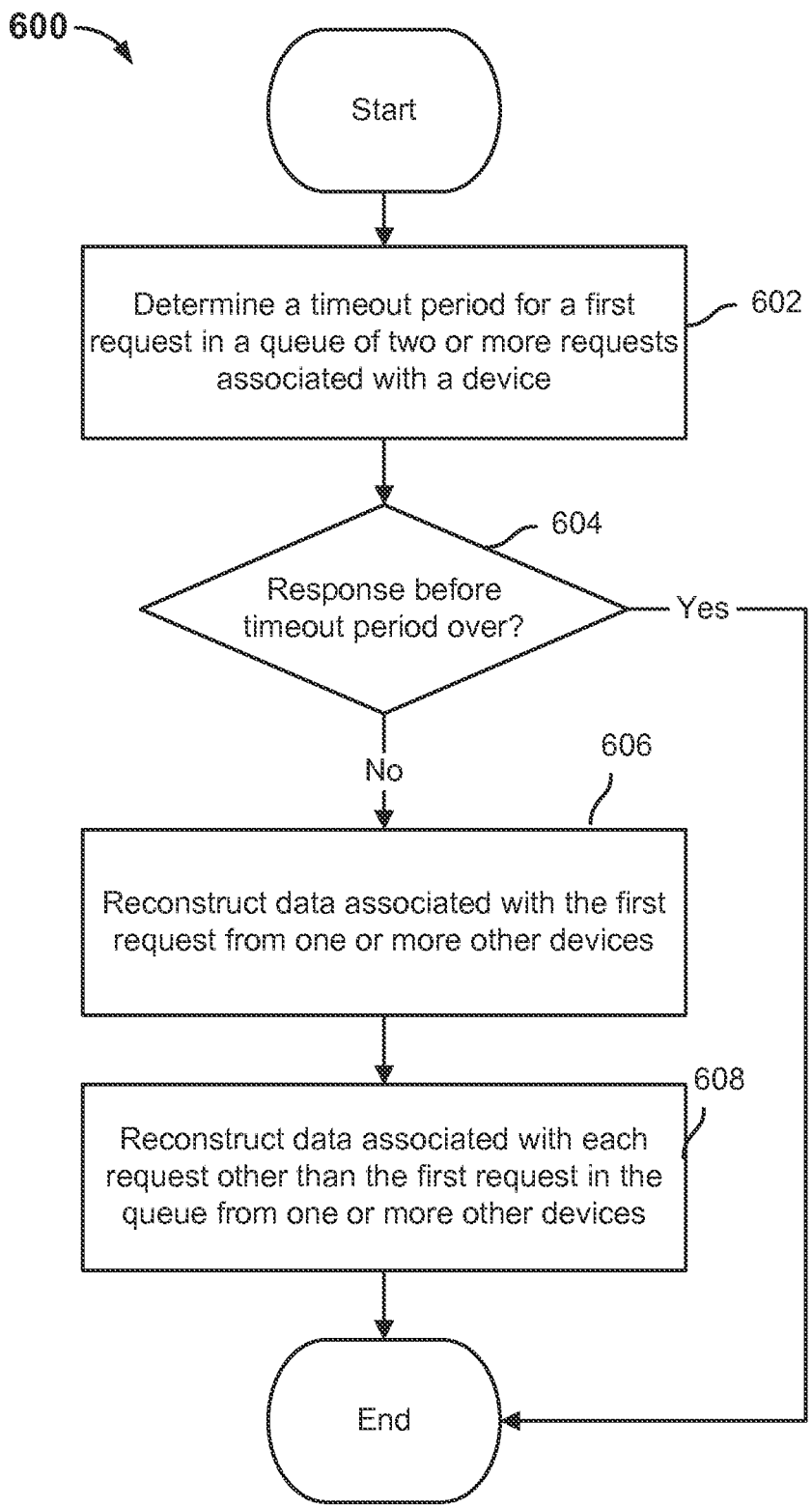
FIG. 6 is a flow diagram showing an embodiment of a process for avoiding a long access latency.

FIG. 6 is a flow diagram showing an embodiment of a process for avoiding a long access latency. In some embodiments, process 600 is implemented using RAID layer 202. In some embodiments, process 300 is implemented using process 600.

In some embodiments, process 600 is similar to process 400 except that more than one request is sent to a device at a time.

At 602, a timeout duration for a first request in a queue of two or more requests associated with a device is determined. In some embodiments, a queue of two or more requests are associated with a device and where the device processes one request at a time as the other requests wait in the queue. For example, one scenario in which a queue of two or more requests are associated with a device is when a batch of two or more requests are sent to the device at once. In some embodiments, for the first request in the queue of a device, a timeout duration is determined based on one or more factors. For example, the factors could include one or more of the following: a fixed timeout length assigned (e.g., by a system administrator) to the device, a size of data requested, a priority associated with the request, a priority associated with the device, a priority associated with the entity (e.g., an application or other caller) that issued the request (e.g., because some requesting entities are more sensitive to latency than others), and a current queue length associated with the device.

At 604, it is determined whether a response from the device is received before the first request times out. For example, once the batch of requests is issued to the device, a clock will run until the timeout duration determined for the first request is over. In the event that the response is received before the timeout duration is over, the first request is considered to have been serviced and in which case the process ends. In the event that the response is not received before the timeout duration is over, the device is assumed to be in a slow access period and control passes to 606.

At 606, data associated with the first request is reconstructed from one or more other devices. In some embodiments, the data associated with the request is obtained via a reconstruction operation to one or more devices in the group of devices other than the device to which the request was originally sent/intended that also store portions of the requested data and/or parity information that can be used to reconstruct the requested data. In some other embodiments, the data associated with the request is obtained via a request to one or more devices at a tier of storage different than the tier of storage to which the request was originally sent/intended for, where the different tier of storage stores at least some data redundant to the data that is stored at the original tier of storage.

At 608, data associated with each request other than the first request in the queue is reconstructed from one or more other devices. In various embodiments, once it is determined that the first request in the queue associated with a device has timed out, then it is assumed that the device is in a slow access period and the other requests in the queue are serviced by reconstructing the data without waiting until these other requests time out. Requests to the device that has been determined to be in the slow access period are resumed once it is determined that the device is no longer in the slow access period. In some embodiments, a device is determined to be no longer in the slow access period when one or more requests issued to the device are completed by the device (e.g., when the first request in the queue that previously timed out is completed by the device) or a certain period of time has elapsed since it was determined that the device is in a slow access mode. In some other embodiments, instead of reconstruction, the requested data associated with the other requests is requested from another copy of the requested data in a different tier of storage.

Figure 7:
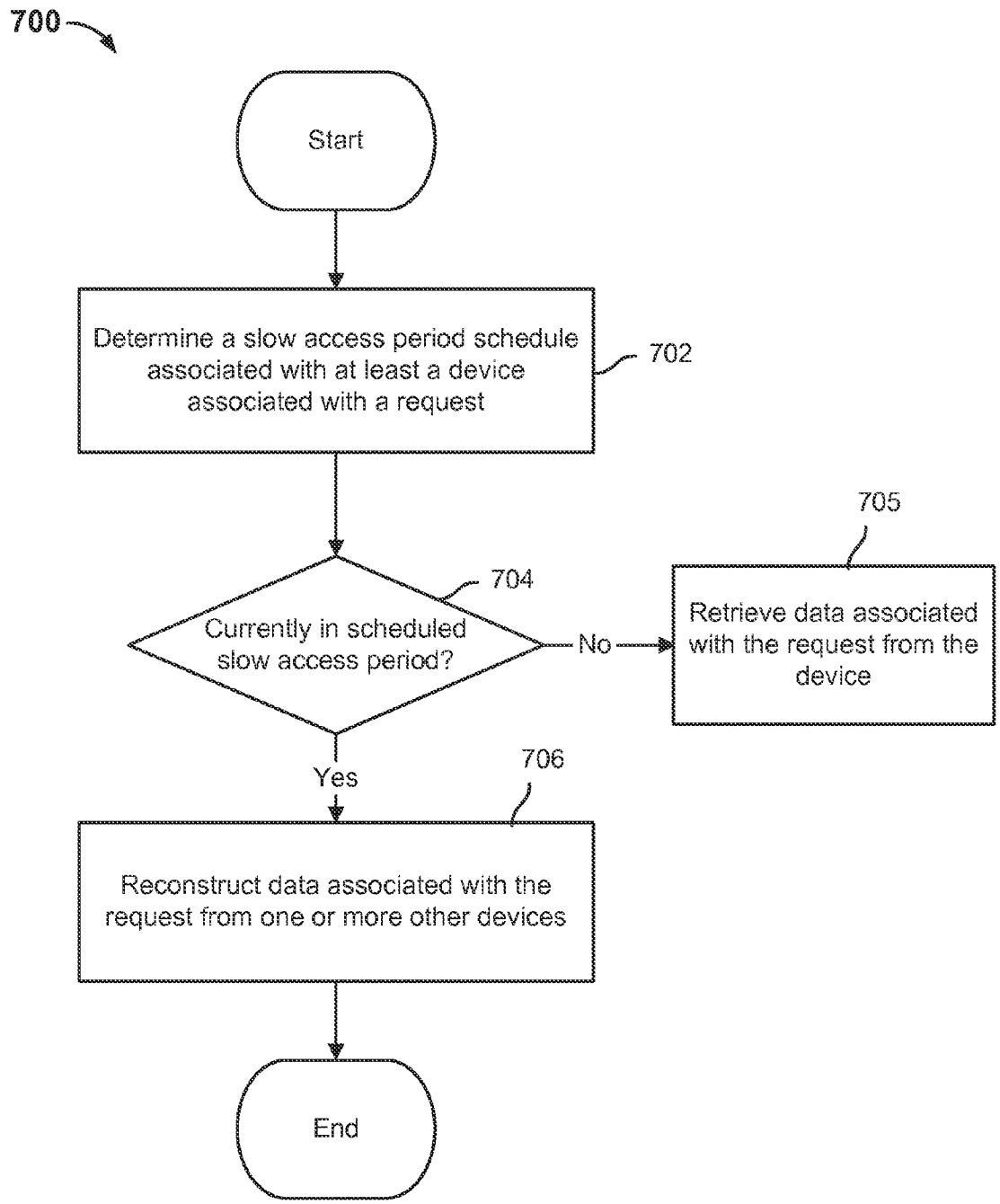
FIG. 7 is a flow diagram showing an embodiment of a process for scheduling slow access periods.

FIG. 7 is a flow diagram showing an embodiment of a process for scheduling slow access periods. In some embodiments, process 700 is implemented using RAID layer 202. In some embodiments, process 300 is implemented using process 700.

At 702, a slow access period schedule associated with at least a device associated with a request is determined. In some embodiments, the request is received at the RAID layer to be issued to one device of a group of redundant storage devices (e.g., SSDs). In some embodiments, each of the devices in the group is scheduled to enter a forced slow access period based on a determined slow access schedule for the group. In some embodiments, the determined slow access schedule is configured such that no two devices in the group would be in a slow access period during overlapping times. In some embodiments, when a device is forced to enter a scheduled slow access period, a state of the device is set such that it indicates that the device is currently in a slow access period. The determined slow access schedule for the storage devices can be, for example, based on a variety of changing states in the system. For example, states can include the rates at which data is read or written or the history of occurrences of slow periods in the past. In some embodiments, a device will be forced to enter into a slow access period every 15 to 20 minutes depending on the rate of data being written to the system.

In some embodiments, the length of time of a slow access period for a device is usually determined to be the time between the start of the slow access period and when the device starts completing read requests at a normal latency again. In some embodiments, the length of a slow access period is not fixed but dynamic and depends on factors such as how much internal activity a device has to perform. In some embodiments, the length of time of a slow access period for a device coincides with the length of time it takes for the command that forced the device into the slow access period to complete. Put another way, the duration of the completion of the command that forced the device into the slow access period coincides with the duration that the device needs to be in a slow access period to complete its internal maintenance.

In some embodiments, the determined schedule forces each device to enter a slow access period not substantially more frequently than the device itself would have entered a slow access period if it were allowed to enter the slow access period on its own. So, the forcing of devices to enter slow access periods is intended to change the start times of such periods but not the frequencies at which they occur.

At 704, it is determined whether the device to which the request is to be sent is currently in a scheduled slow access period. In some embodiments, a corresponding state associated with the device is checked to determine whether the state indicates that the device is currently in a scheduled slow access state. In the event that it is determined that the device is not currently in a forced slow access, control passes to 705. At 705, the data associated with the request is retrieved from the device. In the event that it is determined that the device is currently in a forced slow access period, control passes to 706.

At 706, data associated with the request is reconstructed from one or more other devices. In some embodiments, the data associated with the request is obtained via a reconstruction operation to one or more devices in the group of devices other than the device to which the request was originally sent/intended that also store portions of the requested data and/or parity information that can be used to reconstruct the requested data. In some other embodiments, the data associated with the request is obtained via a request to one or more devices at a different tier of storage.

FIGS. 8A and 8B are diagrams showing an example of implementing process 700. In the examples, RAID layer 202 is implemented using the example described in FIG. 2. In FIG. 8A, a request is received by RAID layer 202 and the request is to be issued to Device A. However, upon checking a state associated with Device A that indicates whether Device A is currently in a forced, scheduled slow access period, it is determined that Device A is currently in a slow access period. For example, the state indicating that Device A is in a slow access period can be set for Device A when it was forced into that state using the available device-specific command to do so (or it was set when one of the requests to Device A had timed out). If the state indicates that Device A is currently in a slow access period, then the requested data is to be obtained elsewhere. In FIG. 8B, because it is determined that Device A is in a slow access period, RAID layer 202 obtains the requested data via a technique alternative to requesting the data from Device A. In the example, RAID layer 202 performs a reconstruction operation to retrieve the requested data from Devices B, C, D, and E that each stores a portion of the requested data and/or parity information that can be used to reconstruct the requested data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access to data, comprising:
dynamically determining a timeout duration associated with a request associated with a first device based at least in part on an attribute associated with the request, an attribute associated with the first device, or both;
sending the request to the first device;
determining that a response to the request is not received from the first device prior to an end of the timeout duration associated with the request;
in response to the determination that the response to the request is not received from the first device prior to the end of the timeout duration associated with the request, determining for the request that the first device is in a slow access period; and
in response to the determination for the request that the first device is in the slow access period, reconstructing data associated with the request from one or more other devices comprising a redundant storage system in which the first device and the one or more other devices are included.

2. The method of claim 1, wherein the request comprises a read request.

3. The method of claim 1, further comprising determining a timeout duration associated with a previous request.

4. The method of claim 1, further comprising updating a state associated with the first device to indicate that the first device is currently in the slow access period in response to the determination that the response to the request is not received from the first device prior to the end of the timeout duration associated with the request.

5. The method of claim 1, further comprising not using a timeout duration associated with a subsequent request associated with the first device in the event the timeout duration associated with the request expires.

6. The method of claim 1, wherein the attribute associated with the request comprises a size of data associated with the request.

7. The method of claim 1, wherein the attribute associated with the request, the attribute associated with the first device, or both includes one or more of the following: a fixed timeout length assigned to the first device, a priority associated with the request, a priority associated with the first device, a priority associated with an entity that issued the request, and a current queue length associated with the first device.

8. The method of claim 1, further comprising updating a state associated with the first device to indicate that the first device is in the slow access period based at least in part on an indication that the slow access period has been triggered by a command sent to the first device.

9. The method of claim 1, further comprising updating a state associated with the first device to indicate that the first device is in the slow access period based at least in part by observing respective latencies of requests submitted to the first device.

10. The method of claim 1, wherein the first device was forced into the slow access period by an issued command associated with triggering a device to enter the slow access period.

11. The method of claim 1, further comprising determining that the first device is no longer in the slow access period based at least in part on a specified period of time having elapsed.

12. The method of claim 1, further comprising determining that the first device is no longer in the slow access period based at least in part on receiving the response to the request from the first device.

13. The method of claim 1, further comprising determining a controlled slow access period schedule for the first device and the one or more other devices, wherein the controlled slow access period schedule indicates when each device is to be forced into a respective slow access period.

14. The method of claim 13, wherein the controlled slow access period schedule is configured to not schedule for two or more devices to be forced into slow access periods at overlapping periods.

15. The method of claim 13, wherein the controlled slow access period schedule is configured such that a device does not enter the slow access period significantly more often than it would have if it had been allowed to enter the slow access period on its own.

16. The method of claim 1, wherein the first device and the one or more other devices comprise at least a portion of a RAID group.

17. The method of claim 16, wherein reconstructing data associated with the request from one or more other devices comprises using parity data stored on one or more of said other devices to reconstruct data stored on the first device.

18. A system of providing access to data, comprising:
one or more processors configured to:
dynamically determine a timeout duration associated with a request associated with a first device based at least in part on an attribute associated with the request, an attribute associated with the first device, or both;
send the request to the first device;
determine that a response to the request is not received from the first device prior to an end of the timeout duration associated with the request;
in response to the determination that the response to the request is not received from the first device prior to the end of the timeout duration associated with the request, determine for the request that the first device is in a slow access period; and
in response to the determination for the request that the first device is in the slow access period, reconstruct data associated with the request from one or more other devices comprising a redundant storage system in which the first device and the one or more other devices are included; and
a memory coupled with the one or more processors and configured to provide the processors with instructions.

19. The system of claim 18, wherein the one or more processors are further configured to determine a timeout duration associated with a previous request.

20. The system of claim 18, wherein the processor is further configured to update a state associated with the first device to indicate that the first device is in the slow access period in response to the determination that the response to the request is not received from the first device prior to the end of the timeout duration associated with the request.

21. The system of claim 18, wherein the one or more processors are further configured to not determine a timeout duration associated with a subsequent request associated with the first device in the event the timeout duration associated with the request expires.

22. The system of claim 18, wherein the attribute associated with the request comprises a size of data associated with the previous request.

23. The system of claim 18, wherein the attribute associated with the request, the attribute associated with the first device, or both includes one or more of the following: a fixed timeout length assigned to the first device, a priority associated with the previous request, a priority associated with the first device, a priority associated with an entity that issued the previous request, and a current queue length associated with the first device.

24. The system of claim 18, wherein the one or more processors are further configured to determine a controlled slow access period schedule for the first device and the one or more other devices, wherein the controlled slow access period schedule indicates when each device is to be forced into a respective slow access period.

25. The system of claim 24, wherein the controlled slow access period schedule is configured to not schedule for two or more devices to be forced into slow access periods at overlapping periods.

26. The system of claim 24, wherein the controlled slow access period schedule is configured such that a device does not enter the slow access period significantly more often than it would have if it had been allowed to enter the slow access period on its own.

27. The system of claim 18, wherein the first device was forced into the slow access period by an issued command associated with triggering a device to enter the slow access period.

28. The system of claim 18, wherein the one or more processors are further configured to determine that the first device is no longer in the slow access period based at least in part on a specified period of time having elapsed.

29. The system of claim 18, wherein the one or more processors are further configured to determine the first device is no longer in the slow access period based at least in part on receiving the response to the request from the first device.

30. A computer program product for providing access to data, the computer program product being embodied in a non-transitory computer readable storage medium and comprising computer executable instructions, which, when implemented by a processor, cause a computer to perform the steps of:
dynamically determining a timeout duration associated with a request associated with a first device based at least in part on an attribute associated with the request, an attribute associated with the first device, or both;
sending the request to the first device;
determining that a response to the request is not received from the first device prior to an end of the timeout duration associated with the request;
in response to the determination that the response to the request is not received from the first device prior to the end of the timeout duration associated with the request, determining for the request that the first device is in a slow access period; and
in response to the determination for the request that the first device is in the slow access period, reconstructing data associated with the request from one or more other devices comprising a redundant storage system in which the first device and the one or more other devices are included.

* * * * *